APPARATUS FOR SELECTING AN INDEX CARD OF SHEET-LIKE FORM

Filed Nov. 9, 1971 8 Sheets-Sheet 1

INVENTORS
GERHARDT SANDT & HEINRICH OSTERMEIER
BY

INVENTORS
GERHARDT SANDT & HEINRICH OSTERMEIER
BY
M.R. Keta

APPARATUS FOR SELECTING AN INDEX CARD OF SHEET-LIKE FORM

Filed Nov. 9, 1971 8 Sheets-Sheet 3

GERHARDT SANDT
HEINRICH OSTERMEIER
INVENTORS
BY [signature]

APPARATUS FOR SELECTING AN INDEX CARD OF SHEET-LIKE FORM

Filed Nov. 9, 1971

INVENTORS
GERHARDT SANDT & HEINRICH OSTERMEIER
BY
M.A. Kesler

March 20, 1973 G. SANDT ET AL 3,721,342
APPARATUS FOR SELECTING AN INDEX CARD OF SHEET-LIKE FORM
Filed Nov. 9, 1971 8 Sheets-Sheet 5

GERHARDT SANDT
HEINRICH OSTERMEIER
INVENTORS
BY W. R. Keston

APPARATUS FOR SELECTING AN INDEX CARD OF SHEET-LIKE FORM

Gerhardt Sandt
Heinrich Ostermeyer

INVENTORS

BY [signature]

APPARATUS FOR SELECTING AN INDEX CARD OF SHEET-LIKE FORM

Filed Nov. 9, 1971 8 Sheets-Sheet 7

GERHARDT SANDT & HEINRICH OSTERMEIER
INVENTORS
BY

INVENTORS

BY

United States Patent Office 3,721,342
Patented Mar. 20, 1973

3,721,342

APPARATUS FOR SELECTING AN INDEX CARD OF SHEET-LIKE FORM

Gerhardt Sandt and Heinrich Ostermeier, Cologne, Germany, assignors to Datagraph AG, Zug, Switzerland Filed Nov. 9, 1971, Ser. No. 196,952
Claims priority, application Germany, Dec. 23, 1970, P 20 63 414.4
Int. Cl. B67c 9/00
U.S. Cl. 209—80.5 17 Claims

ABSTRACT OF THE DISCLOSURE

A stack of index cards are retained in hanging fashion by metal strips secured along their top edges. Coding strips along one edge of the cards allow a selected card to be withdrawn from the stack. The metal strips have jaw-like members having narrowed recesses opening in the direction of removal of the card. A rod with faces diverging in the removal direction is moved into the recess for widening the jaw-like member for removing the card, the length of the faces being greater than the path of removal of the index cards.

Figure 1:
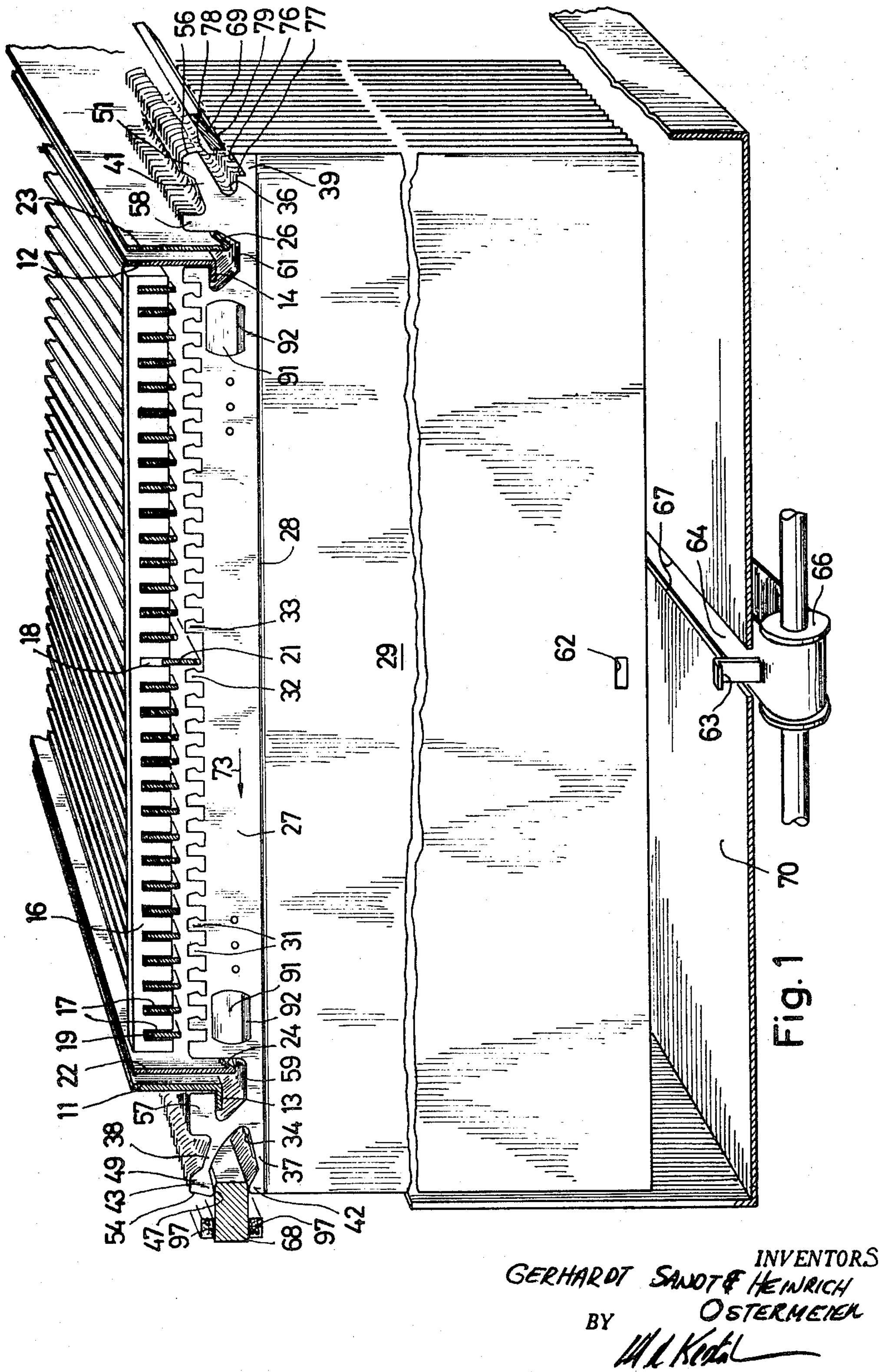

The invention relates to apparatus for selecting an index card of sheet-like form which is retained by at least one of its edges on a tab made of a strip of steel above a plurality of index cards, said apparatus comprising a jaw-like recess which is narrowed by at least one lip in a face lying perpendicular to the direction of movement, the narrowed section of said recess having, when unclamped, a width slightly less than the effective cross-section of a rod which can be moved transversely to its longitudinal direction into the recess and in the direction of removal while the recess is widened, the force produced by the widening being greater than the detrimental force which holds the index card in its original position and is produced by adhesion, pressure or the like, and precision-worked faces on the rod which are directed towards the recess and lie adjacent to the narrowed section during movement in the direction of removal, said faces diverging in a direction of removal, when seen in cross-section.

The resilient member described in one prior embodiment was a bent spring. The magnetic index cards are approximately 0.2 mm. thick. In comparison the spring material must be a great deal thicker if it is desired to apply the force of approximately 150 p. on index cards of DIN A4 size necessary for trouble-free removal.

In another prior embodiment the resilient member was made out of the index tab material. The resilient member was formed by the edges of a narrow section in which a rod could be pushed, said rod having a substantially circular cross-section and drawing the selected index card out of the stack when moved in the direction of displacement. Two rods, one pulling and the other pushing, were used for the sake of efficiency.

When e.g. the pulling rod moved into the jaw-like recesses, the narrow sections of all the tabs had to be widened to an extent equal to the diameter of the rod. To prevent the necessary force from being applied abruptly, the rods executed a twisting or meandering movement so that one end of the rod would pass into the recesses before the other end.

When the rod was moved in the direction of displacement this twisting movement was repeated so that the rod did not have to be moved simultaneously through all the narrow sections. However, because for reasons of space the rod can only be positioned at an angle of several degrees to the stack of index cards and therefore because the recess can only have a limited depth, it is impossible in the case of large stacks i.e. a great number of index cards, to prevent the rod from passing in practice simultaneously through a larger number of narrow sections. To move the rod outwards a force of approximately 150 kp. is required for subjecting the drive mechanism of the rod to preliminary tension.

It frequently happened that a tab of a selected index card was not removed. After several tests the reason for this was found to be that the rod obtains such acceleration in the direction of movement from those narrow sections through which it has just passed and which snap closed that because of the moment of inertia of the selected index card the rod no longer drives the latter which remains in the stacks. Therefore a snapping effect is produced. If the recess was further narrowed, the single index card would be driven by a greater force, but at the same time the snapping effect would also be increased.

The problem underlying the invention is to provide an apparatus whereby in the case of large stacks, e.g. 1000 index cards, the selected index card can be removed from the stack without a snapping effect and with absolute efficiency, in which case even the additional means for producing the twisting movement of the rod can be omitted, a single rod acting as a pulling rod is sufficient and high precision needs only to be provided on one recess.

This problem is solved in accordance with the invention in that the point at which the faces meet is further removed in the direction in which the card is extracted than those points adjacent to the narrow section of the tab, and in that there are no indentations or elevated sections in the vicinity of these points.

Therefore, within the path of card removal the rod can never reach that point where a snapping effect could be produced.

It is advantageous if the rod is approximately rectangular in cross-section and comprises at least one flat face falling in the direction of the recess, the angle of inclination of said face being in the region of several degrees, and preferably within the region of one degree. In this way the force to be applied without a twisting movement is distributed over a great area and increases in a straight line with a comparatively small rise. It subsequently falls slowly in a stright line when the rod is removed.

It is advantageous if the length of the face is greater than the path of removal of the index card. When moving in the direction of displacement the rod can thereby easily and involuntarily slip slightly out of the narrow section without the latter slipping entirely off the rod.

It is advantageous if the first face is connected to a second precision-machined face which is parallel to the direction of removal and over which the narrow section slides. The resilience can be hereby slowly increased and kept constant, when the narrow section is located on the parallel face because the narrow section is then located in an area of constant widening. Then it is no longer so important where the rod movement ends during movement against the direction of displacement, because it is only necessary for the narrow section to be supported at some point on the parallel faces.

It is advantageous if a third face is located in front of the first face and is substantially more inclined than said face and also precision-machined. This third face improves the positioning of the rod in the narrow section or recess. The third face is therefore used for preliminary centering.

It is advantageous if the rod is symmetrical in relation to a face lying in the direction of removal. In this way it is possible to move the rod accurately in the centre of the narrow section and in this connection the tab is neither raised nor pushed down.

It is advantageous if the vertical spacing between both the second faces is less than or less than 1% greater than the width of the narrow section, if the rod can be inserted in the recess without substantial widening of the narrow section and tilted about a longitudinal axis of this point while the narrow section is widened, and if the rod can be moved in the direction of removal when the narrow section is widened. This embodiment is particularly suited to a large storage medium because the rod can be inserted into the recess in this manner without force having to be applied to widen the narrow sections. The force is hereby saved for the first disadvantageous widening of the narrow sections. Moreover, a device thus equipped can also be operated noiselessly.

It is advantageous if the more inwardly positioned section of the first lip rounded to form a web comprises a comparatively small face pointing mainly in the direction of the tilted second face, if the second lip is flat in the direction of removal and its front edge comprises a flat edge which also points in the direction of the tilted second face. In this way the rod even when tilted can bear against relatively large faces.

It is advantageous if the end of the tab directed away from the recess comprises an indentation having a first saw-tooth flank which is directed in the direction of card removal and towards the index card and connected on the outside to a second more sharply inclined saw-tooth flank and if there is provided a slide rule which can be moved slightly above and along the first saw-tooth flank after moving in the direction of removal of the rod and, if necessary, conveys stationary tabs further in the direction of removal before movement in said direction is completed. The index cards can in this way be pushed out of the stack even if they remain suspended in some way or other after a short movement in the direction of displacement. They are then completely moved out of the stack by the slide rule.

It is advantageous if the rod is provided with a lubricating means for at least its second face.

It is advantageous if the lubricating means is a felt strip soaked in a lubricant. This means of lubrication is always necessary when the narrow section and rod are made of tempered steel. Even after a great number of cycles and high surface pressure the narrow sections do not become worn and costly surface treatment is not required.

It is advantageous if the tabs are deburred by electrolytic means. After this treatment it is possible to prevent, in any unexpectedly advantageous manner, the tabs from catching on one another. It is advantageous if small plates are adhesively attached to and have the same thickness as the tab, the front face of which, extending in the direction of movement, is provided with a bevel edge. Consequently the tabs are always at a fixed distance from one another so that they cannot remain caught in one another due to burr on the like. Owing to the bevel edge the small plates do not get caught on one another, but slide over one another without catching when the index card is removed.

It is advantageous if the side edges of the index card parallel to the direction of removal are guided by a parallel guide means fixed to the frame, if coding teeth are located on one side of the edges into which coding strips can be inserted, if a gear wheel device is rotatably mounted on both ends of the tab comprising at least one thin gear wheel which is arranged close to an outer face of the tab, if the bearing is effected with a friction greater than the force which holds the selected index card and tab in the stack, if each of two tooth shafts extend along the stack and its toothing meshes with the gear wheels, and if the two tooth shafts can be rotated in opposite direction in order to draw the index card out of the stack. In this alternative solution snapping effects are also completely avoided. The tolerances can also be further reduced without reducing operating capability since the teeth do not have to mesh in a particularly defined manner. Also the extent of the friction is not critical as long as it is only above a given value. Only rotary movements which are easier to control than reciprocating movements are produced, and there are no problems in conveying the cards. The force necessary for the tooth shaft is always the same irrespective of whether an index card has been selected or whether it is in the selecting stage.

It is advantageous if there are provided two identical gear wheels which are rigidly connected by an axle plate extending through the tab. The index card is hereby removed from the stack symmetrically to its median plane.

It is advantageous if the jaw-like recess comprises two indentations forming the bearing means for the axle plate and if said indentations exert a pressure on said axle plate. In this way a substantial amount of friction can be simply applied at the same time and any play avoided.

It is advantageous if, perpendicular to the direction of removal, the tab is provided with a groove into which a retaining rule extending along the stack can be inserted, the coding strips being first inserted into the toothing and the rule being disengaged, whereupon the tooth shafts are rotated and the rule inserted into the groove at the end of a first removal movement and the index card is completely removed from the stack when the tooth shafts continue to rotate. The index card can be hereby drawn slightly more out of the stack, the other cards being rigidly held by the coding strips and the selected index card being subsequently drawn out further and the unselected index cards being rigidly held by the rule.

Figure 2:
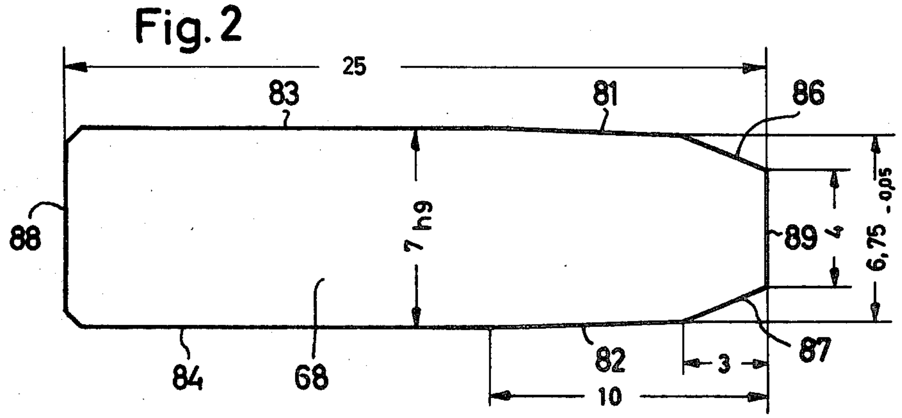
Figure 3:
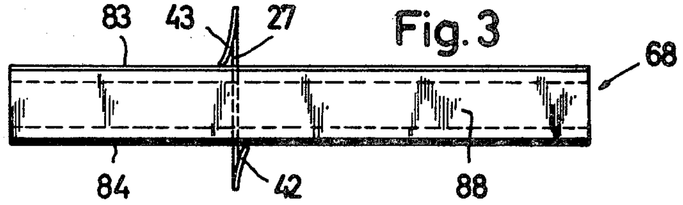
Figure 4:
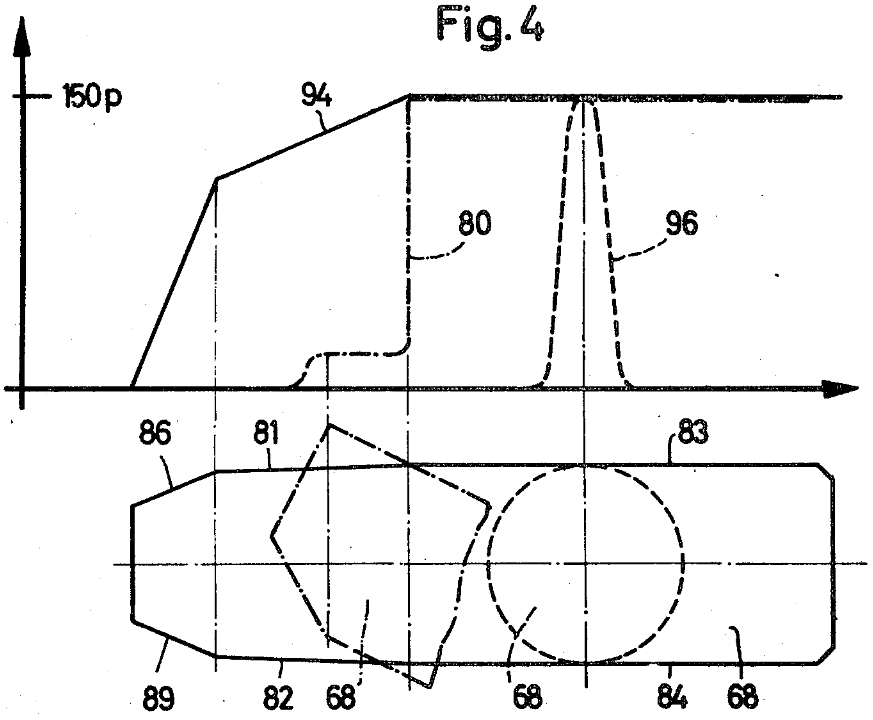
Figure 5:
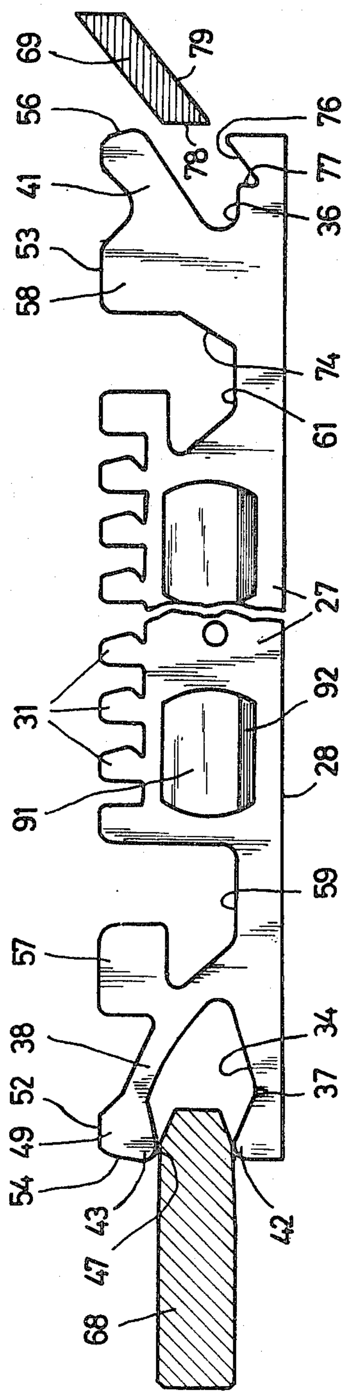
Figure 6:
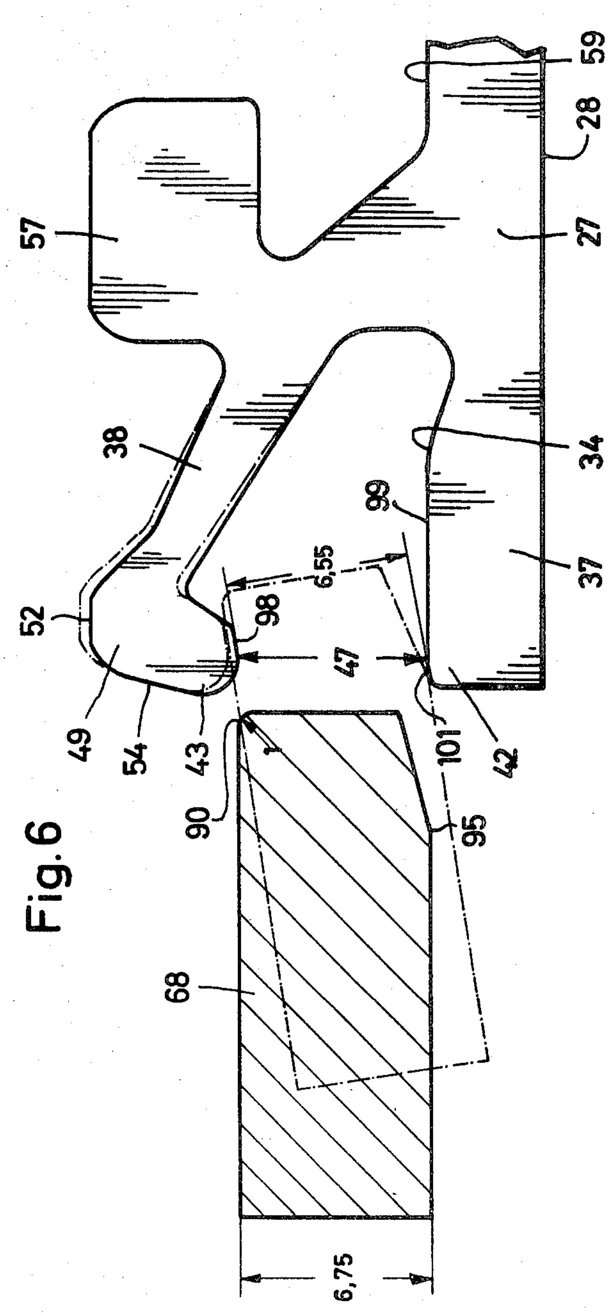
Figure 7:
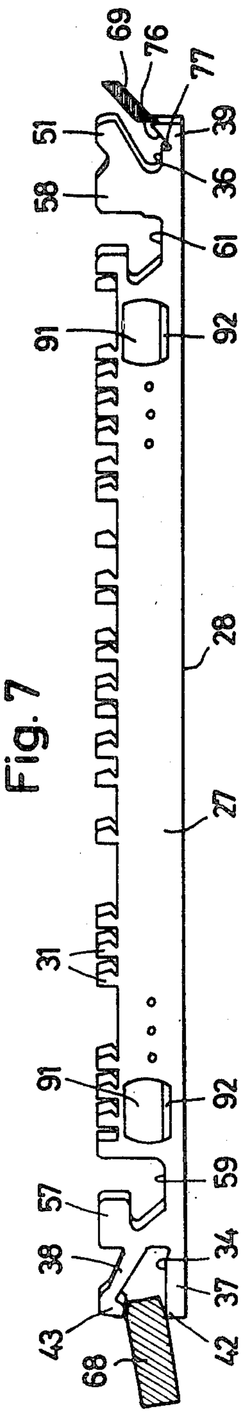
Figure 8:
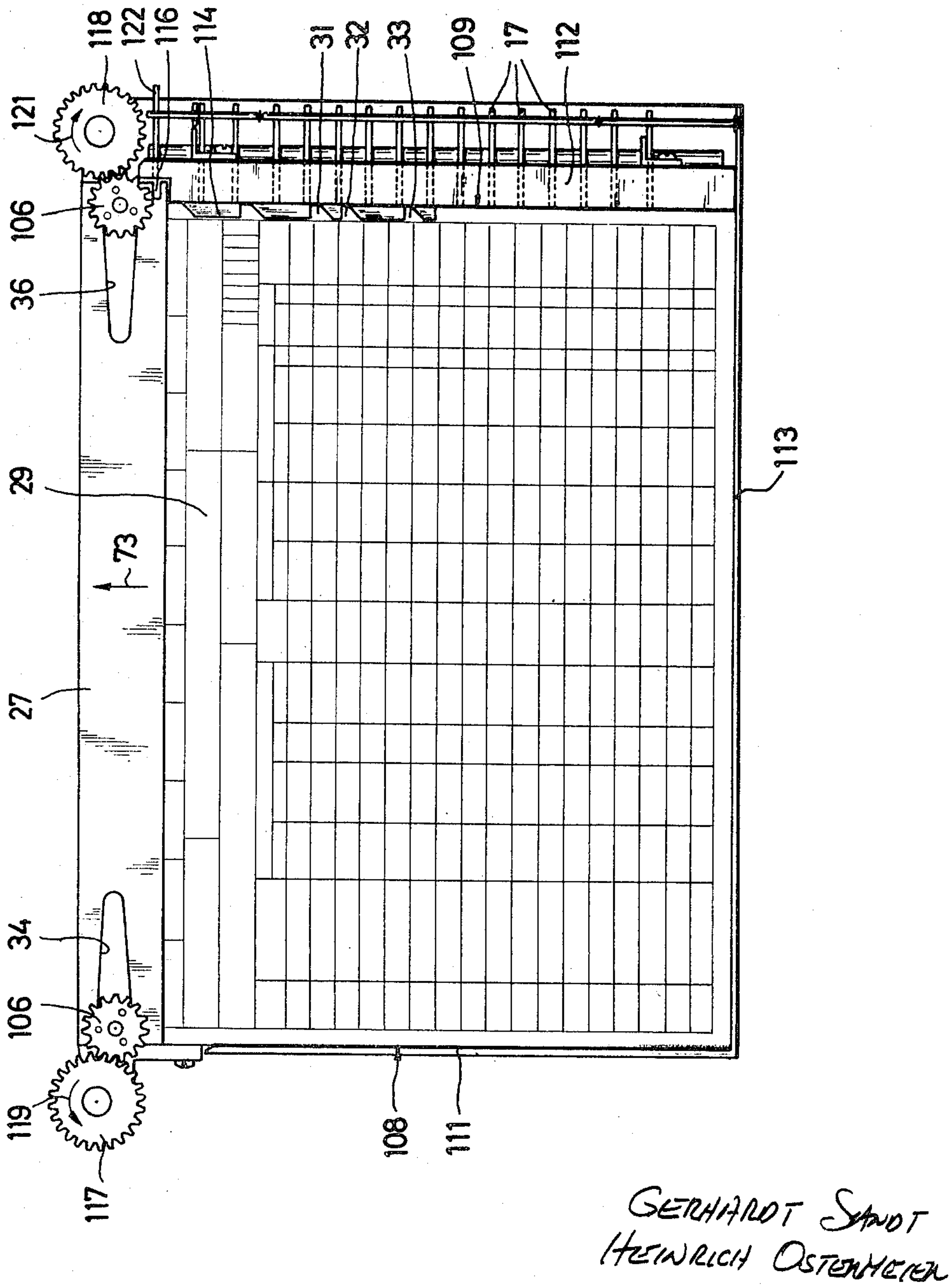
Figure 9:
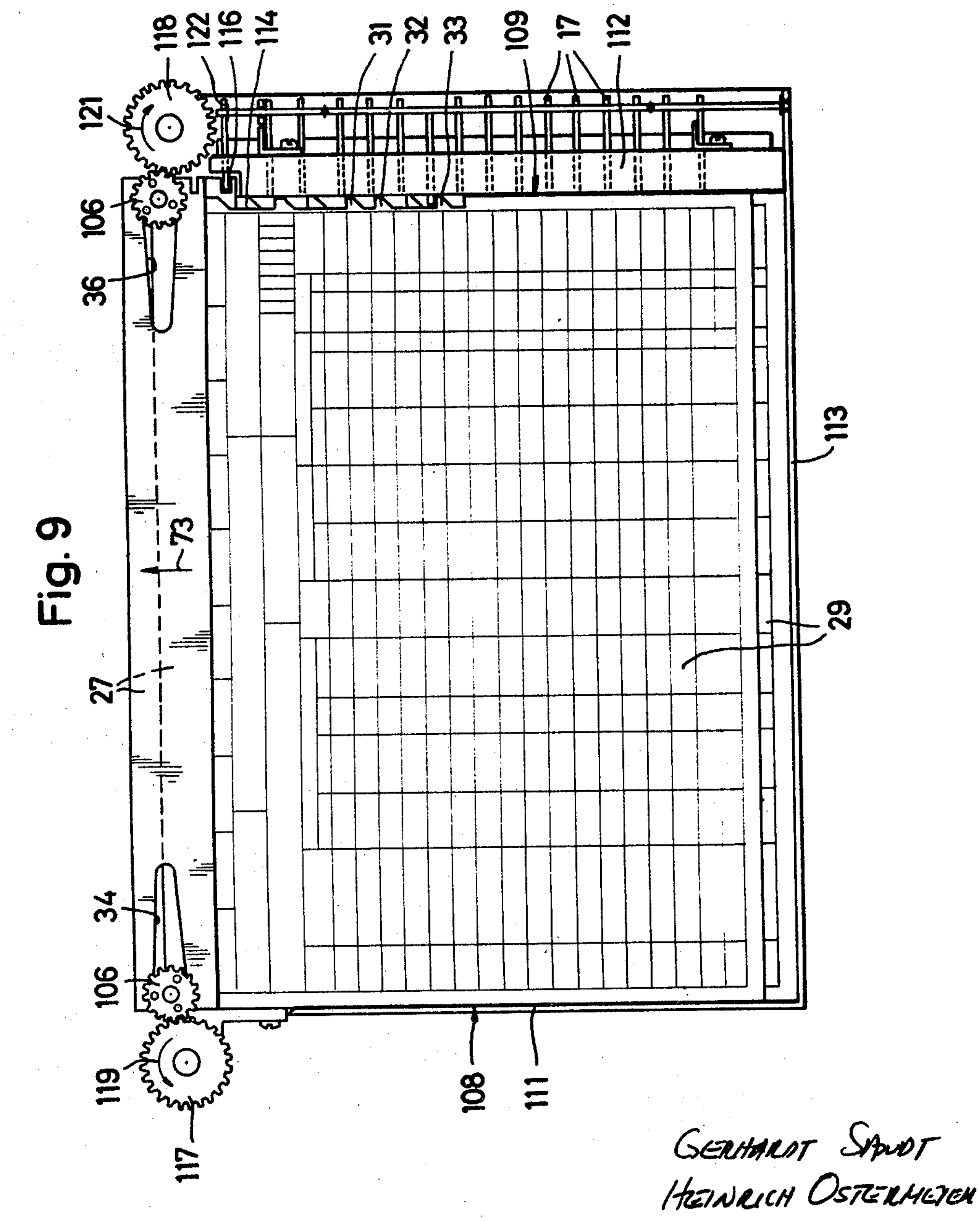
Figure 10:
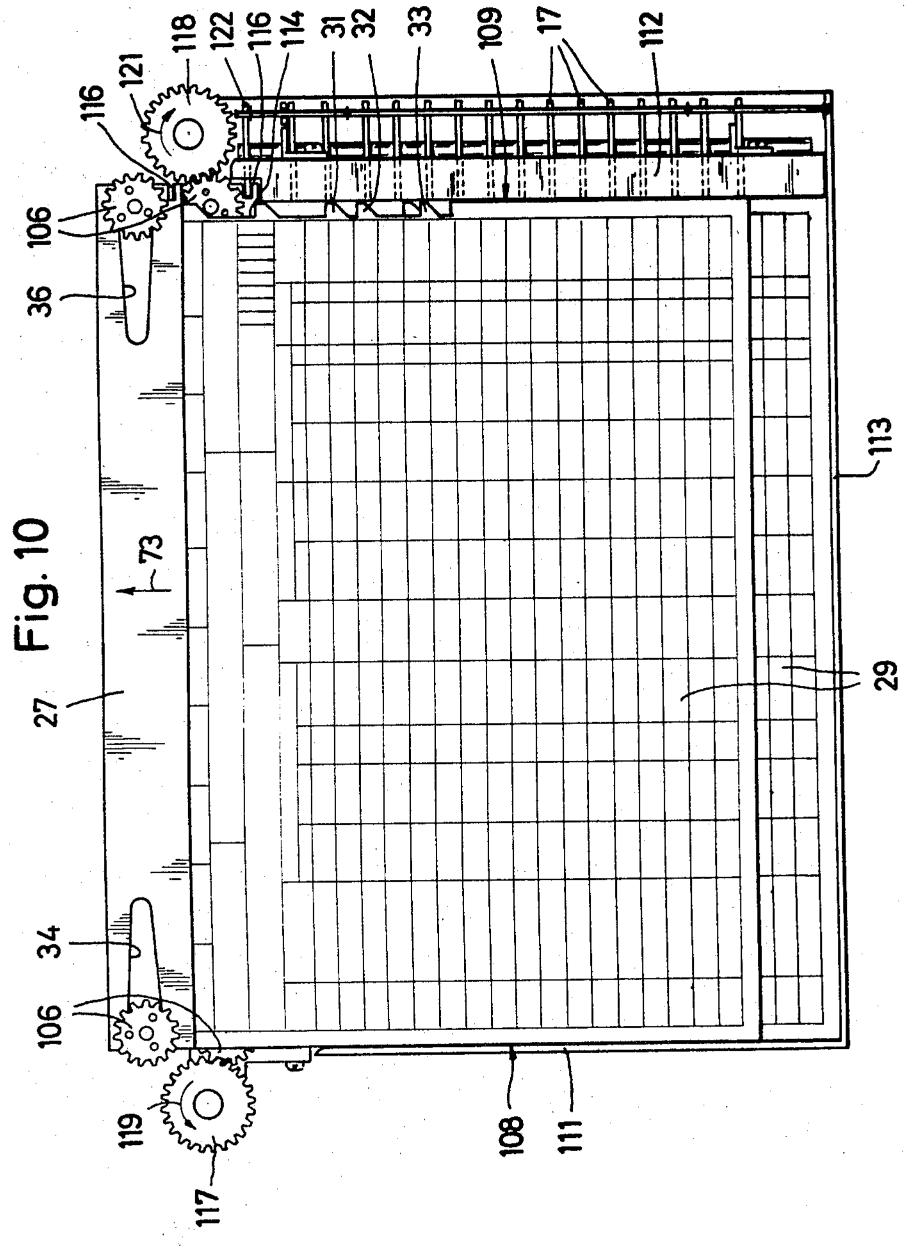
Figure 11:
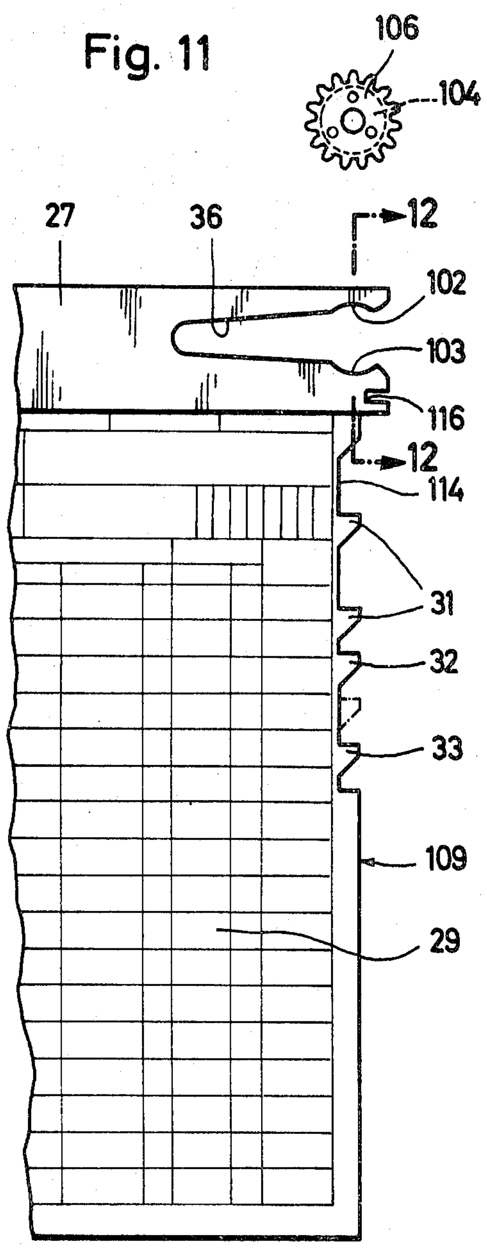
Figure 12:
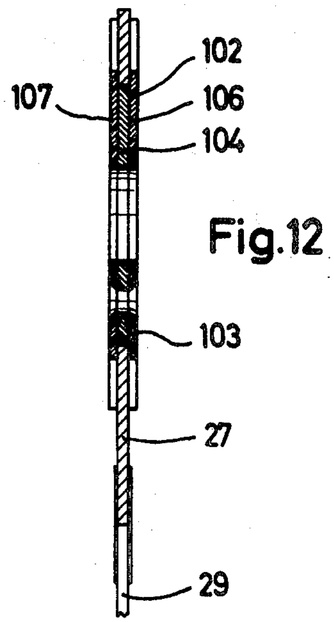

Other advantages and features of the present invention are described with the aid of preferred embodiments in which:

FIG. 1 shows a simplified diagrammatic view of a card index system in a first operative position, FIG. 2 shows a cross-section through a removing bar, FIG. 3 shows a front view of the removing bar with the tab being moved as far as the second face, the distortions being exaggerated in the drawing, FIG. 4 is a diagram showing the relationship between force and movement in the index card system, FIG. 5 shows an enlarged front view of a tab including the removal bar and a slide rule, FIG. 6 shows a precise view of the recess on a tab, FIG. 7 shows two tabs, one of which remains suspended during selection and the other has a recess as shown in FIG. 6, FIG. 8 shows a front view of a second card index system in a first operative position, FIG. 9 shows the card index system shown in FIG. 8 in a second operative position, FIG. 10 shows the card index system shown in FIG. 8 in a third operative position, FIG. 11 shows a marginal section of the tab of the last preferred embodiment, the toothed wheel having been removed, FIG. 12 shows a cross-section through the toothed wheel.

Two L-shaped rails 11 and 12 are supported some distance from and parallel to one another in a frame (not shown) of a card index system, their feet 13, 14 pointing in the same direction, i.e. to the left. A comb 16 which is located perpendicular to the L-shaped rails 11 and 12 and the teeth of which extend downwards, is also rigidly secured on this frame. A second identical comb is located parallel thereto at a distance which is approximately equal to the length of the card index system. Coding strips 19, 21 are guided so as to be movable up and down in gaps 17, 18 in the comb 16. When inoperative, they are positioned as shown in the drawings. There are considerably more coding strips 19, 21 than are shown in the drawings.

On the right hand side of the L-shaped rails 11 and 12 shown in FIG. 1 there are provided two sliding bars 22, 23 running parallel and adjacent thereto, which are movably guided up and down on the frame (not shown) of the card index system. Their lower ends are rounded and deflected upwards in the form of a half arrow 24, 26.

Tabs 27 which are shown true to scale and made of spring steel 0.3 mm. thick, are suspended from the L-shaped rails 11, 12. The lower sides of the tabs 27 are provided with a straight edge 28 adjacent to which there is located a card 29 which is connected by an adhesive strip to the tab 27 and extends parallel to the straight edge 28 on either side of the tab 27. Opposite the central area of the straight edge 28 there are provided teeth 31, 32, 33, said teeth or the intermediate gaps acting as coding points. The coding strips 19, 21 can be lowered into the gaps if the tab 27 occupies the position as shown in the drawings. In order that the teeth 31, 32, 33 may be forced open so that the required coding is effected, they are weakened in the area leading into the broad section of the tab thereby producing a nominal breaking point. Open-edged recesses 34, 36 which are bounded by two jaw-like branches 37, 38 and 39, 41, respectively are provided in, respectively, the right-hand and left-hand faces of the tab 27. On the branches 37, 38 there are provided two lips 42, 43 which point towards one another and form a narrow section 47. As can be seen in the drawing, the lips 42, 43 are rounded to the left and right of the narrow section 47; the lips 42, 43 are also hardened. The upper branches 38, 41 are provided with, respectively, extensions 49, 51, on which stack loosening means can engage to loosen the stack which consists of numerous cards 29 arranged one behind the other and ensuring that the cards 29 and tab 27 are conveyed in a specific direction, as provided e.g. in U.S. patent application 18,950. The upper edges 52, 53 are in alignment with the upper edge of the tab 27.

The extensions 49, 51 lead with inclined edges 54, 56 into the lip 43 and the branch 41. These inclined edges 54, 56 prevent the tab from being left suspended when moved out of the stack to or from a reading, writing, checking station or the like.

In the position shown in the drawing tongues 57, 58 also extend upwards from the upper branches 38, 41, the left tongue 57 being larger than the right tongue 58. The L-shaped rails 11 and 12 engage in L-shaped recesses 59, 61, respectively. When lowered, the sliding bars 22, 23 are also located therein, as shown in FIG. 1.

All the cards 29 are provided with a lower aperture 62 in which a hook 63 of a conveyor belt 64 can engage, said conveyor belt being guided by a driven roller 66. The hook can be moved in a channel 67 in a conveyor base 70.

Also in the right and left-hand sections of the tabs 27, a bar 68 and slide rule 69 extend parallel to the L-shaped rails 11 and 12. The slide rule 69 can co-operate with a saw-tooth which is provided in the right-hand recess 36 and comprises a first saw-tooth flank 76 extending downwards to the left and a saw tooth flank 77 directed vertically upwards. Corresponding to the shape of the saw-tooth, the slide rule 69 is provided with a vertical face 78 and a lower face 79 which slopes downwards like the saw-tooth 76.

The bar 68 is provided with two first faces 81, 82 which form an angle of two degrees. These two faces are connected on the left to two other faces 83, 84 which are parallel to one another and flat. The faces 81, 82 are connected on the right to third faces 86, 87 which are also flat. The bar 68 is made of C60 tempered steel DIN 17200 so that it has a Vickers hardness of 760. The faces 81–87 are also fine-ground in accordance with the DIN standard. In addition the bar 68 is provided with front and rear faces 88, 89.

Two identical small plates 91, 0.2 mm. thick, which are provided with a bevel edge 92 on the front extending in the direction of movement, are adhesively attached to the tab 27.

The apparatus operates as follows: In order that the stack consisting of the cards 29 may be secured, the sliding bars 22, 23 are moved downwards until they engage in the L-shaped recesses 59, 61. It can be seen that this is mainly achieved by the deflected section 26 together with the inclined edges 24. In the preferred embodiment the tab 27 is coded so that a gap is produced between the teeth 32, 33. The bar 68 is located on the left of the recess 34 and the slide rule 69 to the right of and above the saw-tooth. The bar 68 is then moved to the right into the recess, thereby separating the lips 42, 43 from one another while they slide over the faces 81, 82, because the distance between the faces 81, 82 is, on the one hand, greater than the distance between the lips 42, 43 and, on the other hand, this spacing is increased more and more. However, as shown in FIG. 2, the widening amounts to only a few tenths of a millimetre.

FIG. 4 shows a force-path diagram and, below that, three types of bars 68. These bars are illustrated below the force-path diagram so that it is possible to plot which force applies to which position of the narrow section. If a bar 68 having a circular cross-section is used, as shown by the broken line, this produces the curve 96 in which the necessary removal force of 150 p. is attained, but is required in practice over an infinitesimally short distance. This distance over which the removal force is applied is too small in the case of larger capacity systems.

The curve 94 which applies to the bar shown in FIG. 2 is shown separately. If the narrow section is located on the faces 86, 87 there is a relatively sharp increase in the force over a short distance. The force increases more slowly over the faces 81, 82 in order to remain constant when the narrow section is located on the faces 83, 84.

In this embodiment it is not absolutely necessary for the narrow section to pass over the faces 83, 84. If the bar 68 is slightly widened, the removal force of 150 p. is obtained on the surface 81, 82. In this case owing to the small increase in this area the accurate positioning of the narrow section is not a critical matter and does not necessitate laborous adjusting and high precision.

If the bar 68 which is shown more accurately in FIG. 2 is used, the curve 80 which is indicated by a dot-and-dash line is obtained. When the bar is introduced into the narrow section, a small and negligible force is produced at first which force then increases abruptly during tilting and remains constant thereafer.

As shown in FIG. 3, an automatically limiting effect can be advantageously achieved depending on the dimensions of the narrow section 47 and the material of the tab 27, of the recess 34 is widened by a given amount, the branches 37, 38 tilt sideways relative to the tab and the force required is appreciably limited. Depending on the selected dimensions, this effect can also be produced at an earlier or later stage on the faces 81, 82.

When the bar 68 occupies the position shown in FIG. 5, the sliding bars 22, 23 are moved upwards out of the L-shaped receses 59, 61. The bar 68 then moves back to the left and the slide rule 69 is tilted downwards.

In this connection the coding strip 21 then rigidly holds all the tabs 27 with the exception of that tab in which the tooth is omitted to the right of the coding strip 21. During its movement the bar 68 slides from right to left out of all the narrow sections 47 with the exception of that of the selected tab 27. Owing to the faces 81, 82, the narrow section of the unselected tabs cannot impart to the bar 68 any or only a negligible amount of acceleration to the left if the lips 42, 43 pass onto the faces 81, 82. The angles formed by the faces 81, 82 are smaller than the slip-off angle from the lips 42, 43. The lips 42, 43 can themselves only slip off the faces 86, 87. However, when they are located at this point, the selected tab 27 is already completely removed.

As the movement proceeds the selected tab 27 remains stationary because the tongue 58 is bearing against the L-shaped rail 12. On the other hand, the bar 68 is moved even further to the left and out of the narrow section 47. The sliding bars, 22, 23 are then moved downwards, the left-hand sliding bar 22 coming into contact with the tooth 31 positioned on the outside and to the left and the right-hand sliding bar 23 bearing against the tongue 58. The sliding bars 22, 23 press the tab 27 and card 29 downwards until the lower edge 29 is touching the conveyor base 70. The hook 63 which moves through the channel 67 can then engage in the hole 62 and draw the card 29 forward and feed it to the data processing system.

Both the bar 68 and the lips 42, 43 withstand these stresses extremely well if the upper and lower sides of the bar 68 are provided with a felt strip 97 which is impregnated with molybdenum sulphite and lubricates the bar 68 during each working movement.

If for some reason the lips 42, 43 should then slip off the bar 68 before the removal movement is completed, this is not detrimental to a defined outward movement even if the lips slip off the bar after the fifth or tenth stage of the removal movement. If the tab 27 is stopped during movement, as shown in FIG. 7, the tip of the saw-tooth flank 76 of the selected tab is located to the left of the tip of the saw-tooth flank 76 of the unselected tab. If the slide rule 69 is then tilted downwards in a cyclic manner, it comes into contact with the saw-tooth flank 77 of the selected tab 27 moving the latter completely to the left through the removal path which is equal to the projection of the length of the saw-tooth flank 76 into the horizontal.

A different bar 68 can be used even with a slightly different tab 27 as shown in FIGS. 6 and 7. With this tab the recess 34 is again provided with lips 42 and 43. Looking inwards from its narrow section 47 the upper lip 43 has a very flat rounded edge, compared with the other rounded edge, or a flat edge 98 of 0.8 width. The lower lip 42 is flat, looking in the direction of removal. This flat edge 99 leads into a flat edge 101 which corresponds in inclination and form approximately to the flat edge 98, but is staggered outward relative to the narrow section 47. The narrow section 47 has a width of 6.7 mm. whereas the vertical distance between 98 and 101 is 6.55 mm. The bar 68 has the dimensions as shown in FIG. 2. If the bar 68 is guided into the recess 34 in opposition to the direction of removal 73, the narrow section 47 is widened by a force which, in comparison with the necessary force of removal, is very small since the narrow section 47 has a width of 6.7 mm. whereas the bar 68 is 6.75 mm. wide. However, with this very small force all the tabs are first pushed to the right against the L-shaped rail 11. They are brought into line because as a result of some preceding operation one or more of the tabs 27 might be positioned too far to the left. The problem of aligning the tabs 27 is therefore transferred to the bar 68 in this case so that the sliding bar 23 no longer has to perform this operation. This has the advantage that the sliding bars 22, 23 can be resilient in a vertical direction so that they can be flexible and no damage occurs if they meet an unforeseen obstacle from above.

If all the tabs 27 are pushed to the right, the bar 68 is tilted, during its further movement, in an anti-clockwise direction about an axis 85 lying approximately 1.2 mm. outside the narrow section 47 until it occupies the position shown by a dotted line. The cards 29 are therefore moved slightly upwards. By raising the left-hand sections of the tabs 27 they are no longer suspended by their entire weight on the L-shaped rail 11 and friction is reduced at this point, i.e. in the vertical branch of the curve 80. In the course of the tilting movement the narrow section 47 is then significantly widened until the necessary removal force is attained. In this connection the bar 68 bears againnst the flat edge 98 and the flat edge 101. When in this position, the bar 68 is moved to the left, the selected tab 27 being also moved to the left with the bar. When the tab 27 has moved as far to the left as possible, the bar 68 is moved even further to the left until its sections 90, 95 which lie vertically below one another at the end of the tilting movement are simultaneously released from the narrow section 47.

This method of removal has proved very successful because it requires little force, maximum loads are comparatively low, the apparatus can move noiselessly and there is minimal friction of the bar 68 in the recess 34. This solution is particularly advisable in the case of large storage systems, e.g. systems containing one thousand cards. After its removal the bar 68 can naturally be also returned to its horizontal position so that no snapping action occurs on the sections 90, 95.

In the final preferred embodiment the tab 27 is again provided with recesses 34, 36 of identical shape which are located on the left and right, respectively. In each recess 34, 36 there are provided two indentations 102, 103 which correspond to the outline of circular segments. They act as bearing means for axle plates 104 and bear against their circumferences with tension so that friction occurs at this point. Toothed wheels 106, 107 having the same form and being fastened in an identical manner are rivetted onto the faces of the axle plates. The difference between the tooth wheels 106, 107 is such that friction is also produced between them and the tab 27. Approximately four teeth of the toothed wheels 106, 107 project over the tabs 27 to the right and left and therefore also extend over the right and left-hand card edges 108, 109. During the movement of the index cards which is to be discussed later, they are guided upwards by plates 111, 112 extending along the card stack. A base 113 prevents the index cards from projecting downwards in an irregular manner or even from falling out.

In the right-hand edge 109 of the card there is again provided a plurality of teeth 31. In the case of the foremost index card, the tooth between the teeth 32, 33 has been removed. Sliding bars 17 are alternatively guided horizontally in the plate 112. A longer recess 114 is provided above the teeth 31, 32, 33 in the card edge 109 and in all the cards 29. A narrow open-edged horizontal slot 116 is located in the tab 27 to the right and slightly above its lower edge.

Two toothed wheel shafts 117, 118 are provided along the upper right-hand and left-hand corner sections of the stack and mesh with all the tooth wheels 106, 107 of all the tabs 27. Their direction of rotation is indicated by arrows 119, 121. Their rotational speed is exactly the same in both cases. Their longitudinal axes are located slightly higher than the axes of rotation of the toothed wheels 106, 107.

The apparatus operates as follows: The sliding bar 122 is drawn to the right out of all the slots 116. Of all the sliding bars 17 only that one which engages in the card edge 109 below the tooth 32 is moved to the left. This tooth is only omitted from the foremost card 29, all the other cards having said tooth. The toothed wheel shafts 117, 118 are then rotated in the direction of the arrows 119, 121. As a result of friction between the toothed wheels 106, 107, the axle plate 104 and the tab 27, the card 29 is guided by the plates 111, 112 and raised slightly in a distance equal to the length of a coding strip. This position is shown in FIG. 9. Because the guided sliding bar 17 bears against the tooth 33, it then prevents the selected card 29 from being raised even higher since the tooth wheels 106, 107 always mesh with the tooth shafts 117, 118. Until now the other cards 29 have been constantly held secure by the guided sliding bar 17.

The sliding bar 122 is then moved to the left and slides into the slot 116 of all the tabs 27, holding the latter firmly in opposition to the force tending to draw them upwards. The guided coding strip is then drawn again to the right, the tooth shafts 117, 118 continue to rotate and the tab 27 and card 29 are transported even further upwards, as shown in FIG. 10, until the tooth wheels 106, 107 hardly or no longer mesh with the tooth shafts 117, 118. The index card has therefore been moved sufficiently far out of the stack so that it may be gripped by some means and transported to another system in a cyclic manner. The sliding bar 122 located on the left does not interfere with this index card edge because the right-hand edge 109 is positioned much further to the left than the right-hand edge of the tab 27 so that the sliding bar 122 cannot engage in the teeth 31, 32, 33.

What we claim is:

1. Apparatus for selecting an index card of sheet-like form which is retained by at least one of its edges on a tab made of strip steel above a plurality of index cards, said apparatus comprising a jaw-like member having a recess which is narrowed by at least one lip in a face lying perpendicular to the direction of movement, a rod which can be moved transversely to its longitudinal direction into the recess and in the direction of removal while the recess is widened, the narrow section of said recess having, when unclamped, a width slightly less than the effective cross-section of said rod, the force produced by the widening being greater than the detrimental force which holds the index card in its original position, and precision-machined faces on the rod which are directed towards the recess and lie adjacent to the narrowed section during movement in the direction of removal, said faces diverging in a direction of removal, when seen in cross-section, and then running together again after the point of maximum spacing the point at which the faces meet being further removed in the direction of card extraction than those points adjacent to the narrow section of the recess and there are no indentations or elevated section in the vicinity of these points.

2. Apparatus as claimed in claim 1, in which the rod is approximately rectangular in cross-section and comprises at least one flat face falling towards the recess, the angle of inclination of said face being in the region of several degrees.

3. Apparatus as claimed in claim 1 in which the length of the faces are greater than the path of removal of the index cards.

4. Apparatus as claimed in claim 1, in which faces are connected to second precision-machined faces which are parallel to the direction of card removal and over which the narrow recess section of the member slides.

5. Apparatus as claimed in claim 1 in which third faces are located in front of said faces and are substantially more inclined than said faces and also precision-machined.

6. Apparatus as claimed in claim 1 in which the rod is symmetrical in relation to a face lying in the direction of card removal.

7. Apparatus as claimed in claim 4, in which the vertical spacing between both the second faces is less than one percent greater than the width of the narrow recess section and the rod can be inserted into the recess without substantial widening of the narrow recess section and tilted about a longitudinal axis at this point while the narrow recess section is widened, and the rod can be moved in the direction of card removal when the narrow recess section is widened.

8. Apparatus as claimed in claim 7 in which the more inwardly positioned section of the lip comprises a small face pointing mainly in the direction of the tilted second face and a second lip is flat in the direction of card removal and its front edge comprises a small face which also points in the direction of the tilted second face.

9. Apparatus as claimed in claim 1 in which the end of the tab directed away from the recess comprises an indentation having a first saw-toothed flank which is directed in the direction of card removal and towards the index card and connected on the outside to a second more sharply inclined saw-toothed flank and in which there is provided a slide rule which can be moved slightly above and along the first saw-tooth flank after moving in the direction of removal of the rod and is arranged to convey stationary tabs further in the direction of removal before movement in said direction is completed.

10. Apparatus as claimed in claim 1 in which the rod is provided with a lubricating means.

11. Apparatus as claimed in claim 10, in which the lubricating means is a felt strip soaked in a lubricant.

12. Apparatus as claimed in claim 1 in which the tab is deburred by electrolytic means.

13. Apparatus as claimed in claim 1, in which small plates are adhesively attached to and have the same thickness as the tab, the front of which, extending in the direction of movement, is provided with a bevel edge.

14. Apparatus for selecting an index card of sheet-like form which is retained by at least one of its edges on a tab made of strip steel above a plurality of index cards, said apparatus comprising a jaw-like member, have a recess which is narrowed by at least one lip in a face lying perpendicular to the direction of movement; the side edges of the index card parallel to the direction of removal are guided by a parallel guide means fixed to a frame; coding teeth are located in one of the side edges into which coding strips can be inserted; a gear wheel device is rotatably mounted on both ends of the tab comprising at least one thin gear wheel which is arranged close to an outer face of the tab; the bearing is effected with a friction greater than the force holding the selected index card and tab in the stack; each of a pair of tooth shafts extend along the stack and its toothing meshes with the gear wheels; and the two tooth shafts can be rotated in the opposite direction in order to draw the index card out of the stack.

15. Apparatus as claimed in claim 14, in which there are provided two identical gear wheels which are rigidly connected by an axle plate extending through the tab.

16. Apparatus as claimed in claim 14, in which the recess in the jaw-like member comprises two indentations forming the bearing means for the axle plate and these indentations exert a pressure on the axle plate.

17. Apparatus as claimed in claim 14 in which perpendicular to the direction of card removal, the tab is provided with a groove into which a retaining rule extending along the stack can be inserted, the coding strips being first inserted into the coding teeth and the rule being disengaged, whereupon the tooth shafts are rotated and the rule inserted into the groove at the end of a first removal movement and the index card is completely removed from the stack when the tooth shafts continue to rotate.

References Cited

UNITED STATES PATENTS

| | | | |
|---|---|---|---|
| 3,630,354 | 12/1971 | O'Brien | 209—80.5 |
| 3,647,064 | 3/1972 | Rosenburgh | 209—80.5 |

ROBERT B. REEVES, Primary Examiner

T. E. KOCOVSKY, Assistant Examiner